United States Patent [19]

McBee

[11] 4,282,702
[45] Aug. 11, 1981

[54] PICKER DRUM SLIP CLUTCH MONITOR

[75] Inventor: Steve H. McBee, Ankeny, Iowa

[73] Assignee: Deere & Company, Moline, Ill.

[21] Appl. No.: 161,081

[22] Filed: Jun. 19, 1980

[51] Int. Cl.³ .............................................. A01D 75/18
[52] U.S. Cl. ........................................ 56/10.3; 56/28; 56/DIG. 15
[58] Field of Search ...................... 56/10.3, 28, 36, 40, 56/41, 43, 44, DIG. 15

[56] References Cited

U.S. PATENT DOCUMENTS

| 3,368,214 | 2/1968 | Swanson | 56/DIG. 15 |
|---|---|---|---|
| 3,505,799 | 4/1970 | Fergason | 56/41 |
| 3,540,028 | 11/1970 | Love | 56/DIG. 15 |
| 3,606,009 | 9/1971 | Cliendenin et al. | 56/DIG. 15 |
| 3,721,301 | 3/1973 | Wensel, Jr. et al. | 56/DIG. 15 |
| 3,958,397 | 5/1976 | Stiff | 56/10.3 |
| 4,133,166 | 1/1979 | Hubbard | 56/44 |
| 4,199,924 | 4/1980 | Eistart et al. | 56/DIG. 15 |
| 4,246,743 | 1/1981 | Anstee et al. | 56/341 |

Primary Examiner—Paul J. Hirsch

[57] ABSTRACT

A monitor for detecting an overload condition of the vertical picker drum on a cotton harvester picker unit. A leaf spring contact is supported above a slip clutch having a driven portion meshing with a driving pinion. An overload condition forces the driven portion upwardly against the contact, shorting the contact to the unit frame which causes an overload indicator lamp on the operator's panel to light.

6 Claims, 2 Drawing Figures

PICKER DRUM SLIP CLUTCH MONITOR

BACKGROUND OF THE INVENTION

The present invention relates generally to cotton harvesters and more particularly to a monitor for detecting picker drum overloads on a picker unit.

In conventional cotton pickers, for example of the type shown in U.S. Pat. No. 4,133,166 issued to A. L. Hubbard on Jan. 9, 1979, there is provided a vertical picker drum supporting a plurality of radially extending cotton picking spindles. A driving gear mounted on a vertical shaft extending upwardly from the drum meshes with the driven portion of a slip clutch. The drum is rotated as the slip clutch is driven by a conventional power source. The drum and its associated drive gears are protected against damage by the slip clutch which removes drive from the driving gear when an overload occurs, for example when a rock or other obstacle becomes lodged against the drum.

The operator of the cotton harvester may not, however, immediately hear the sound generated as the cams and lobes on the drive and driven portions, respectively, slip past each other. This is especially true because sound-proof cabs tend to isolate the operator from the noise of the picker unit. Inability to immediately recognize an overload condition can result in damage to the drum drive as well as lost cotton and reduced productivity.

SUMMARY OF THE INVENTION

It is therefore an object of the present invention to overcome the aforementioned problems.

It is a further object of the present invention to provide a slip clutch monitor for detecting an overload condition of the vertical picker drum on a cotton harvester picker unit. It is another object to provide such a monitor which immediately signals the operator of the harvester when the slip clutch which drives the picker drum begins to slip.

It is yet a further object of the present invention to provide a relatively simple and inexpensive slip clutch monitor for a cotton harvester picker unit which immediately signals the operator of the harvester when the drive and driven portions of the clutch begin to slip with respect to each other.

In accordance with the above objects, a leaf spring contact is supported on but insulated from the top plate of a cotton harvester picker unit by a bushing assembly just above the driven portion of a slip clutch associated with the picker drum drive. When an overload occurs, the driven portion is urged upwardly with respect to the drive portion of the slip clutch and engages the leaf spring contact, grounding the contact to the chassis of the picker unit. An indicator lamp on the operator's panel connected to a power supply on the harvester and to the leaf spring contact lights when the contact is grounded to indicate that the slip clutch is slipping. The operator is immediately alerted to the overload condition without having to rely on hearing the slip clutch.

These and other objects, features and advantages of the present invention will become apparent to those skilled in the art upon reading the following detailed description when taken in conjunction with the accompanying drawings.

DESCRIPTION OF THE PREFERRED EMBODIMENT

Figure 1:
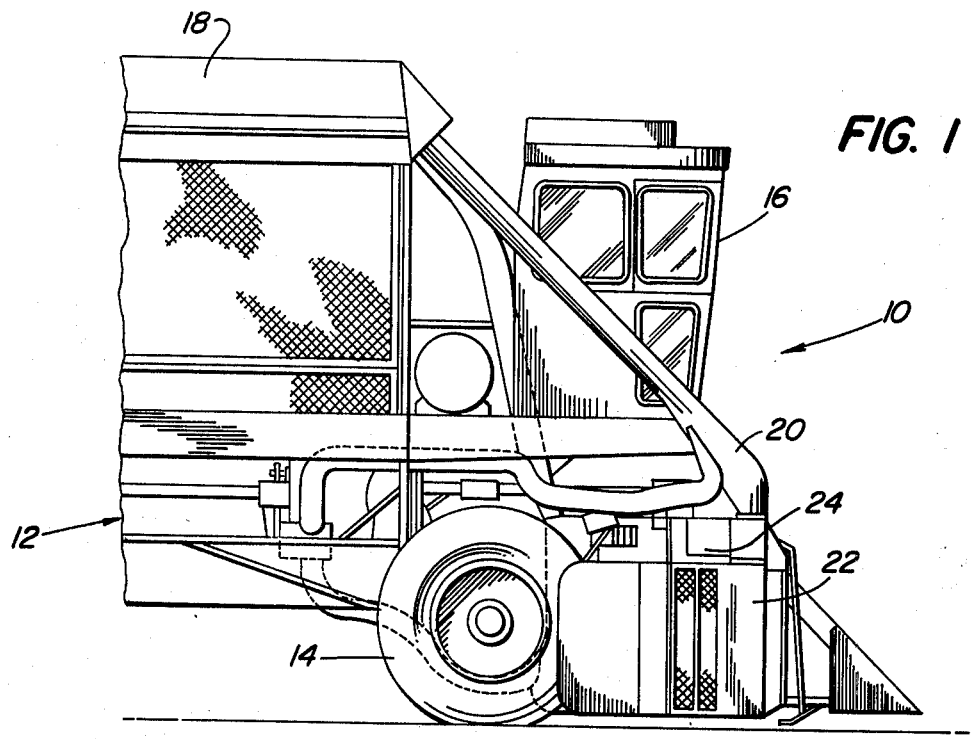
FIG. 1 is a side view of a cotton picker where the monitor system of this invention is utilized.

Referring now to FIG. 1, there is shown a portion of a cotton picker 10 having a main frame 12 carried by front traction wheels 14 and rear steering wheels (not shown). An operator station or cab 16 is supported on the frame 12. Supported behind the cab 16 is a cotton basket 18 which receives cotton through air ducts 20 from a plurality of forwardly mounted picker units 22. The cotton picker 10 is of a conventional design well known to those skilled in the art, and will be described only in sufficient detail to show the location of the device of the present invention with respect to a picker unit 22.

Figure 2:
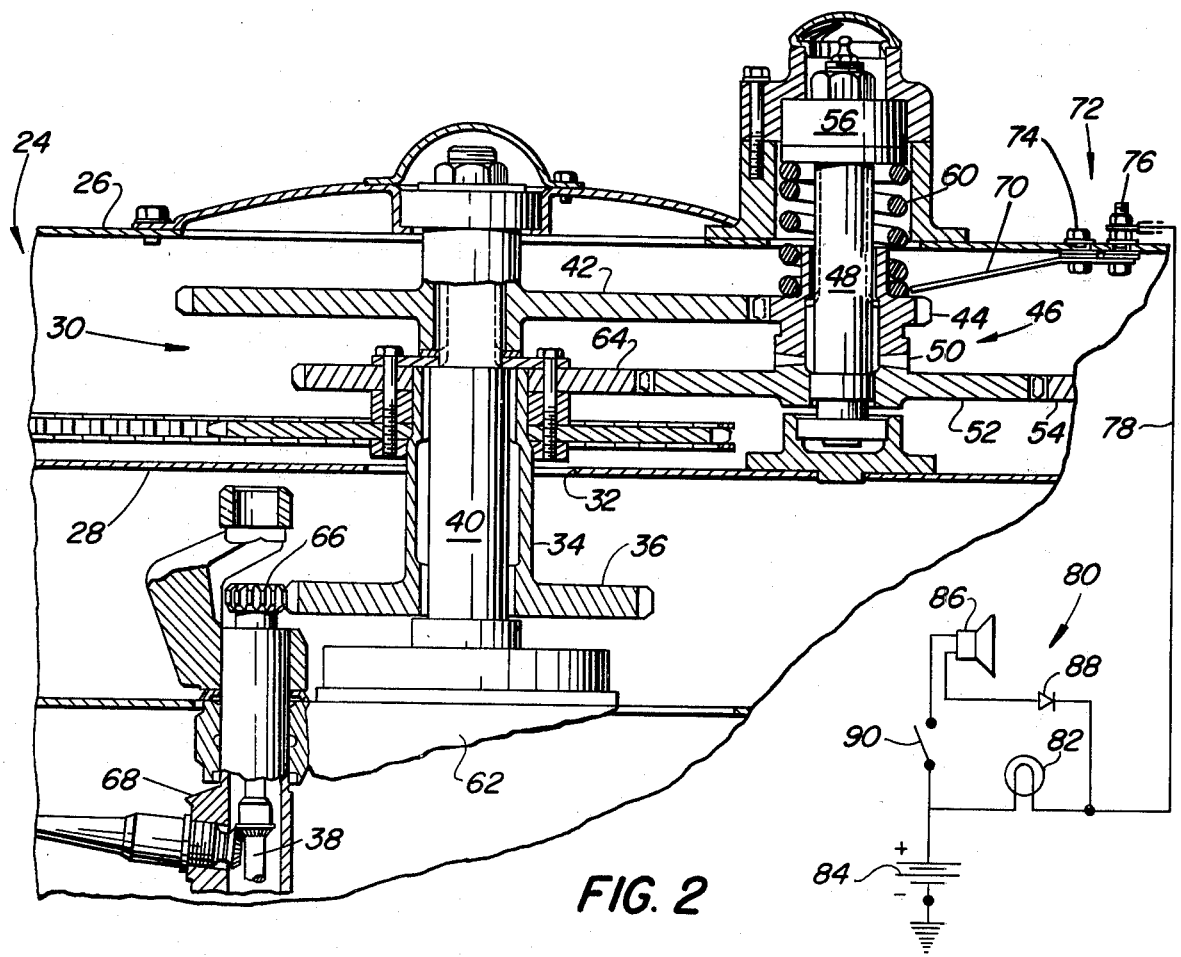
FIG. 2 is an enlarged partial view of the upper portion of the picker unit containing the picker drum drive and showing the leaf spring switch adjacent the slip clutch as well as a wiring schematic of the circuitry associated with the switch.

The picker unit 22 includes a housing 24 having a top plate 26 and a center sheet 28 (FIG. 2) between which is carried a picker drum and picker bar drive assembly 30. The center sheet 28 has a circular opening 32 through which passes a vertical sleeve 34 which carries a gear 36 for driving a spindle shaft 38. The sleeve 34 loosely surrounds a vertical drum shaft 40 supported in the housing 24. The upper portion of the shaft 40 is splined or keyed to a drum gear 42 which constantly meshes with a driven portion 44 of a slip clutch 46 supported on a vertical slip clutch shaft 48. A drive portion 50 of the slip clutch 46 is constrained to rotate with a gear 52 about the axis of the shaft 48. The gear 52 meshes with a driving pinion 54 driven by the main power source (not shown). The shaft 48 is supported by bearings 56 and 58 supported by the top plate 26 and the center sheet 28, respectively.

A down pressure spring 60 urges the driven portion 44 of the slip clutch against the drive portion 50. The slip clutch 46 is of a conventional design which includes mating lobed and cammed sections associated with the driven and drive portions 44 and 50, respectively. As long as the torque required to drive the drum gear 42 remains below a preselected upper limit, the spring 60 maintains the lobed sections between the cammed sections so the driven and drive portions are constrained to rotate in together. If, however, the torque required to drive the drum gear 42 increases above the limit, the driven portion 44 will be urged upwardly against the bias of the spring 60 so that the two sections 44 and 50 can rotate realtive to one another, thereby cutting off drive to the drum gear 42. The drum gear 42 is connected through the shaft 40 to picker drum 62.

The gear 52 also drives a gear 64 connected through the sleeve 34 to the gear 36. The gear 36 drives a pinion 66 on the spindle shaft 38. For a detailed description of picker bar 68 and its drive, reference may be had to the aforementioned Hubbard patent.

A metal leaf spring 70 is supported on the top plate 26 and insulated therefrom by a bushing assembly 72 including bolts 74 and 76. The bolt 76 functions as an electrical terminal connecting the leaf spring 70 with a lead wire 78 from an alarm circuit 80 in the cab 16. Under normal operating conditions, the leaf spring 70 is offset slightly above the driven portion 44. When the drum gear 42 is loaded above the preselected upper limit, the portion 44 is urged upwardly and contacts the leaf spring 70 thereby providing a current path between the lead wire 78 and the housing 24.

The circuit 80 includes a lamp 82 having one terminal connected to the positive terminal of a battery or power source 84. The other terminal of the lamp 82 is connected to the lead wire 78. The negative terminal of the battery 84 is connected to the frame 12 of the cotton picker 10 which is in electrical contact with the housing 24. When the driven portion 44 touches the leaf spring 70, current flows from the battery 84 through the lamp 82, wire 78 and leaf spring 70 to the housing 24, illuminating the lamp to warn the operator that the clutch 46 is slipping.

A horn 86 is connected through a diode 88 to the wire 78, and through an on-off switch 90 to the positive terminal of the battery 84. When the switch is "on", an audible signal is provided by the horn 86 when the portion 44 touches the leaf spring 70. The horn 86 can be disabled by moving the switch 90 to the "off" position.

Having described the preferred embodiment, it will become apparent to one skilled in the art that various modifications may be made without departing from the scope of the appended claims.

I claim:

1. In a cotton harvester having a picker unit housing supporting an upright driven picker drum including picker means for removing cotton from cotton plants, drive assembly means operably connected to and for driving of the picker drum, said drive assembly means including torque responsive means movable from an operating position to an overload position in response to the torque required to drive the picker drum exceeding a preselected level for removing drive from the drum, and indicator means for providing a signal in response to the movement of the torque responsive means to the overload position.

2. The cotton harvester as set forth in claim 1 wherein the torque responsive means comprises a slip clutch and the indicator means includes a switch supported adjacent the clutch and activatable thereby.

3. In a cotton harvester having a picker unit housing supporting an upright picker drum including a plurality of spindles for removing cotton from cotton plants, a drive shaft driving connected to and providing torque to the picker drum, a main drive, a slip clutch supported by the housing and releasably connecting the main drive and the drive shaft, said slip clutch including a portion movable from a first position with respect to the unit housing to a second position in response to an increase in torque requirement to the picker drum beyond a preselected upper limit to disconnect drive between the main drive and the drive shaft, an activatable alarm, and switch means supported by the unit housing responsive to movement of said portion for activating the alarm.

4. The cotton harvester described in claim 3 wherein the switch means comprises a leaf spring supported adjacent the movable portion, said leaf spring being offset from the portion when it is in the first position and contacting the portion when it is in the second position.

5. In a cotton harvester, a picker unit housing, an upright picker drum supported in the housing, a vertical drum shaft extending upwardly from and drivingly connected to the picker drum and carrying a drum gear, a vertical shaft carried by the housing offset from the axis of the drum shaft and supporting a clutch assembly, the clutch assembly including a drive portion connected to a source of power and a driven portion drivingly connected to the drum gear, biasing means for urging the portions towards each other, said drive and driven portions including cammed and lobed sections constraining the portions to rotate together when the torque required to drive the driven portion is below a preselected level but urging the portions apart against the bias of the biasing means when the torque required is above the preselected level, a contact member carried by the unit housing adjacent one of the portions and contacted thereby as the portions are urged apart, and alarm circuit means responsive to the member contacting said one of the portions for providing an indication when the torque is above the preselected level.

6. The cotton harvester as set forth in claim 5 wherein the alarm circuit means includes a power source having a first terminal connected to an electrical indicator and a second terminal grounded to the picker unit housing, the alarm circuit means further comprising conductor means for connecting the indicator to the contact member, wherein said contact member comprises an electrical contact and an insulator supporting the contact from the unit housing, and wherein said one of the portions is grounded to the unit housing and forms a current path between the conductor means and ground when the contact member contacts the portion.

* * * * *

UNITED STATES PATENT AND TRADEMARK OFFICE
CERTIFICATE OF CORRECTION

PATENT NO. : 4,282,702
DATED : 11 August 1981
INVENTOR(S) : Steve H. McBee

It is certified that error appears in the above—identified patent and that said Letters Patent is hereby corrected as shown below:

Column 3, line 48, delete "driving" and insert -- drivingly --.

Signed and Sealed this

Thirtieth Day of March 1982

[SEAL]

Attest:

GERALD J. MOSSINGHOFF

Attesting Officer  Commissioner of Patents and Trademarks